United States Patent Office 3,175,906
Patented Mar. 30, 1965

3,175,906

LIGHT SENSITIVE MATERIAL FOR THE PHOTO-MECHANICAL PREPARATION OF PRINTING PLATES

Oskar Süs and Johannes Munder, Wiesbaden-Biebrich, and Hartmut Steppan, Wiesbaden-Dotzheim, Germany, assignors, by mesne assignments, to Azoplate Corporation, Murray Hill, N.J.

No Drawing. Original application Aug. 18, 1960, Ser. No. 50,317. Divided and this application July 24, 1963, Ser. No. 297,223
Claims priority, application Germany, Sept. 1, 1959, K 38,592
38 Claims. (Cl. 96—33)

In presensitized material useful for the photo-mechanical preparation of printing plates, the o-quinone diazides and p-quinone diazides, including in particular those substituted in the nucleus by sulfonic acid ester or sulfonamide groups, have attained industrial importance, and also the iminoquinone diazides. As a result of the pronounced light-sensitivity thereof, iminoquinone diazides of the benzene series, derived from a 1,4-phenylene diamine substituted in an amino group by an aryl sulfonyl radical, which together with other iminoquinone diazides are described in German Patent 901,500, have proved very satisfactory. When exposed to light, the iminoquinone diazides are converted to products of high molecular weight which are more difficultly soluble in dilute alkalis, dilute acids or organic solvents than are the iminoquinone diazides themselves. This property provides the basis for the suitability of these compounds for the production of images and the preparation of printing plates since, after reproduction coatings prepared therewith have been exposed under a master to light, the remaining light-sensitive portion can be selectively separated from the light-decomposition product using the developers described above. From a negative original, positive images or printing plates are obtained, and vice versa.

In further work on iminoquinone diazides as light-sensitive compounds, a reproduction material containing iminoquinone diazides in the coating has been found which is particularly suitable for the preparation of images or printing plates. In this material, the iminoquinone diazides which constitute the reproduction coating, or which are contained therein, correspond to the general formula

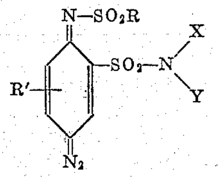

In this formula R is an aryl or substituted aryl radical, X is hydrogen or alkyl, Y is an alkyl, aryl, substituted aryl and R′ is hydrogen, halogen, an alkyl radical or an alkoxy radical.

The distinguishing feature of the particular iminoquinone diazide compounds of the invention is the

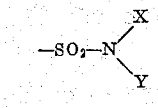

sulfamine radical substituted in the amino group and attached in the ortho position to the aryl sulfonyl radical. The technical advance involved in the use of the iminoquinone diazides corresponding to the general formula given above resides in the greater stability of these compounds, as it is considerably greater than that of the iminoquinone diazides described in German Patent 901,500. The reproduction material of the invention is thus a light-sensitive material with excellent shelf life from which very stable images and printing plates giving very long runs can be prepared.

The stabilizing effect resulting from the sulfamine radical substituted in the amino group, when in the ortho position to an aryl sulfonylimino radical, is accompanied by a loss in light-sensitivity, in comparison with the iminoquinone diazide compounds without the sulfamine radical. However, this effect on the light-sensitivity can be compensated for by the introduction of electro-negative substituents such as halogen, alkoxyl, alkyl, and the like into the nucleus of the aryl sulfonylimino radical or into the sulfamine radical or into both, without the stability of the compounds being influenced.

Exemplary of the compounds of the invention are:

(Formula 1)

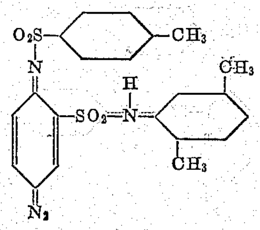

(Formula 2)

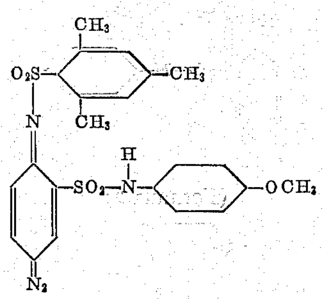

(Formula 3)

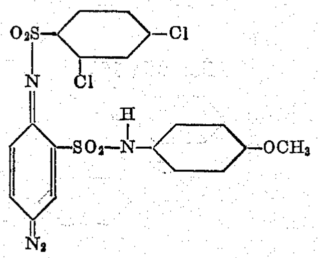

(Formula 4)

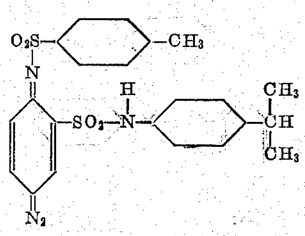

(Formula 5)
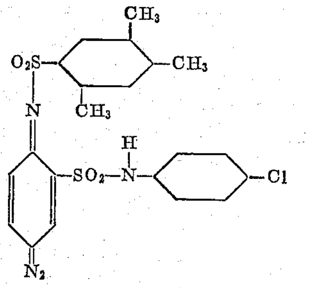
(Formula 6)
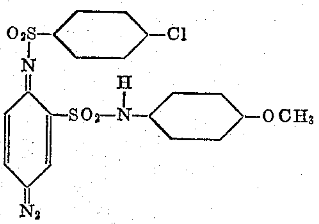
(Formula 7)
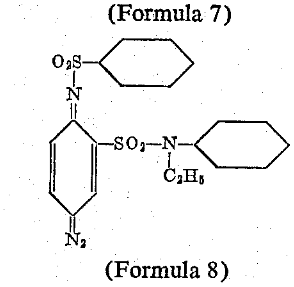
(Formula 8)
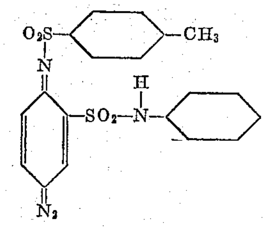
(Formula 9)
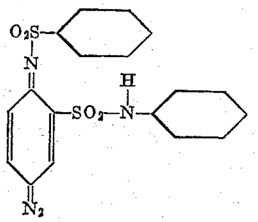
(Formula 10)
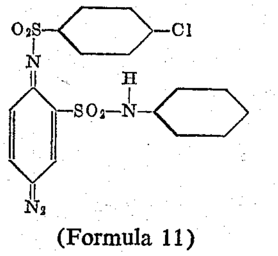
(Formula 11)
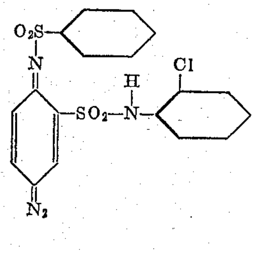
(Formula 12)
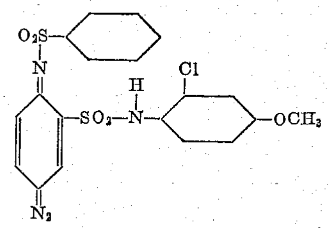
(Formula 13)
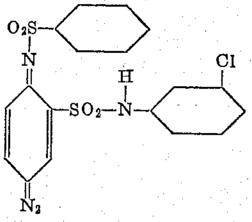
(Formula 14)
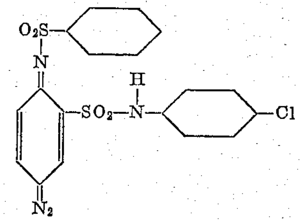
(Formula 15)
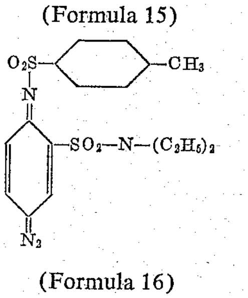
(Formula 16)
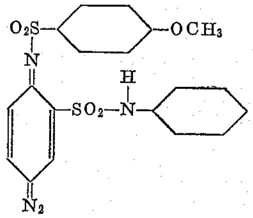
(Formula 17)
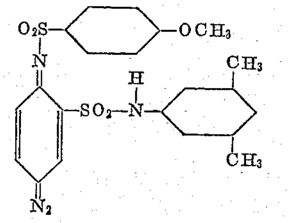
(Formula 18)
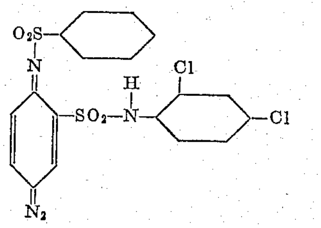

(Formula 19)
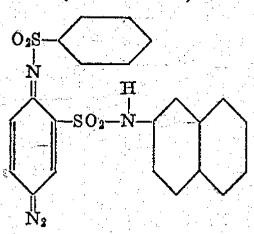
(Formula 20)
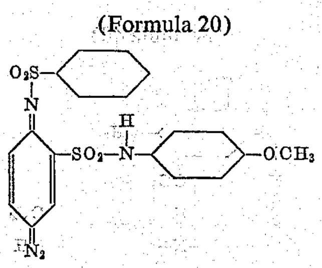
(Formula 21)
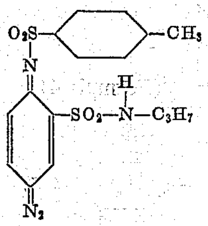
(Formula 22)
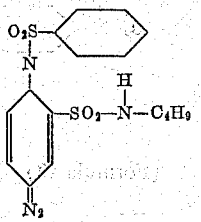
(Formula 23)
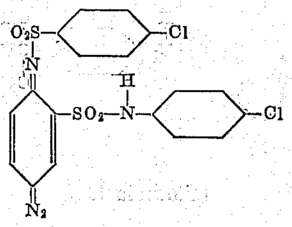
(Formula 24)
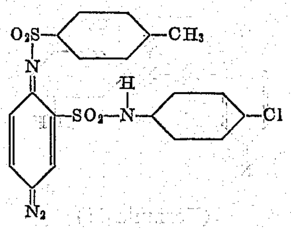
(Formula 25)
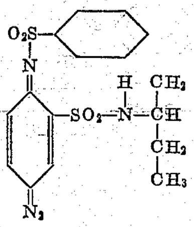
(Formula 26)
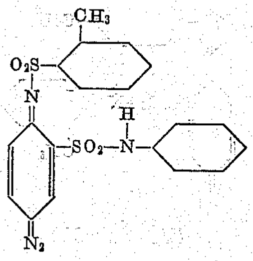
(Formula 27)
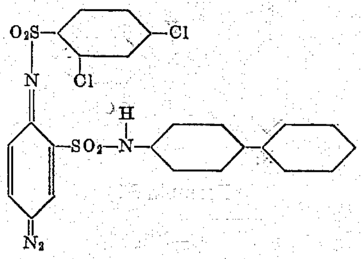
(Formula 28)
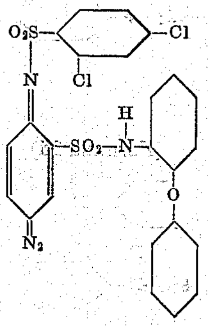
(Formula 29)
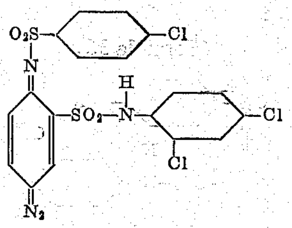
(Formula 30)
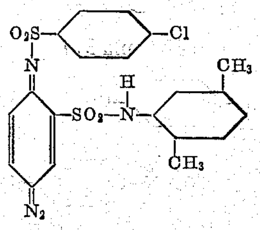
(Formula 31)
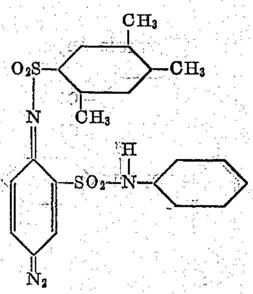

(Formula 32)
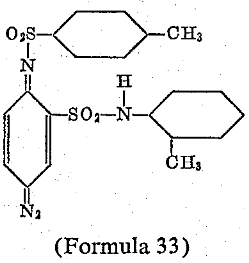
(Formula 33)
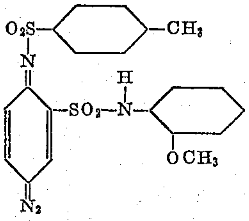
(Formula 34)
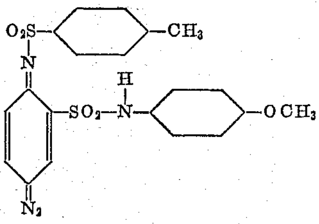
(Formula 35)
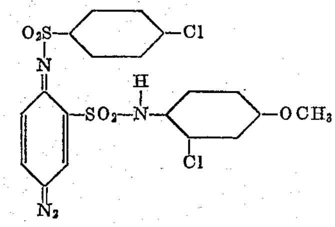
(Formula 36)
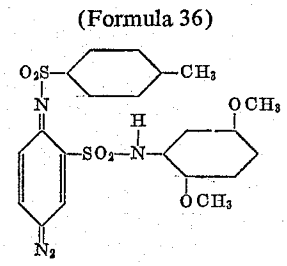
(Formula 37)
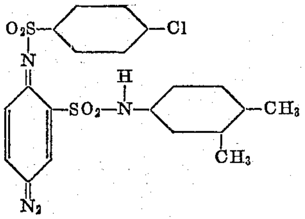
(Formula 38)
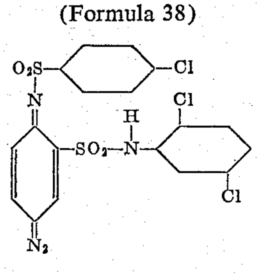
(Formula 39)
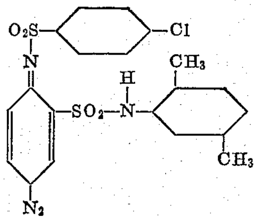
(Formula 40)
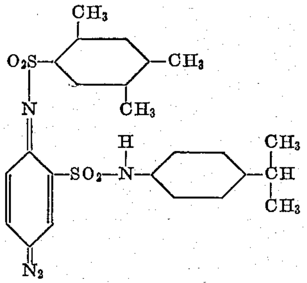
(Formula 41)
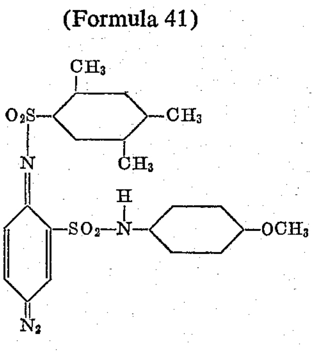
(Formula 42)
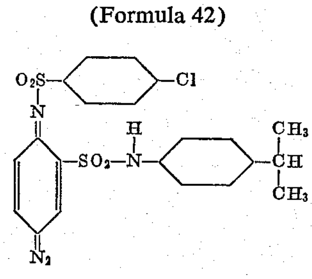
(Formula 43)
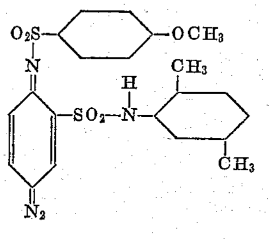
(Formula 44)
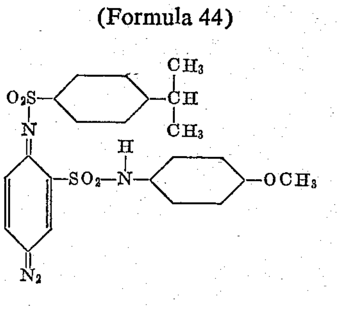

(Formula 45)
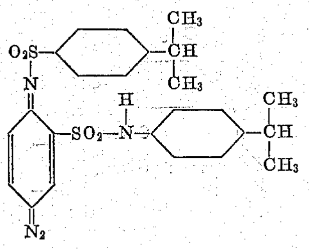
(Formula 46)
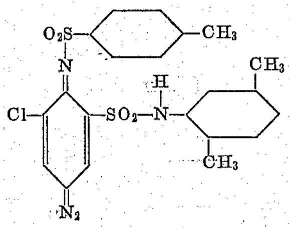
(Formula 47)
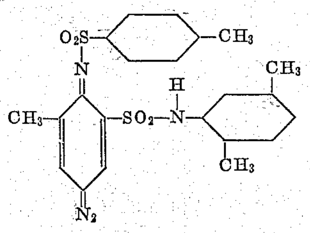
(Formula 48)
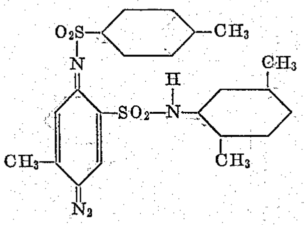
(Formula 49)
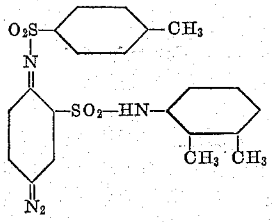
(Formula 50)
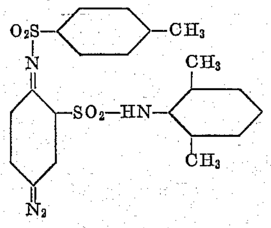
(Formula 51)
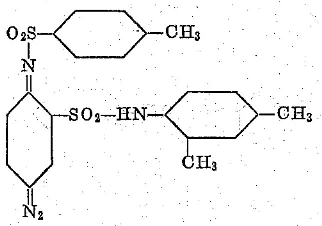
(Formula 52)
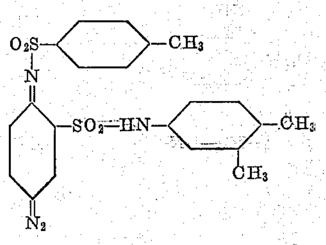
(Formula 53)
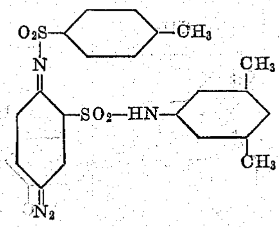
(Formula 54)
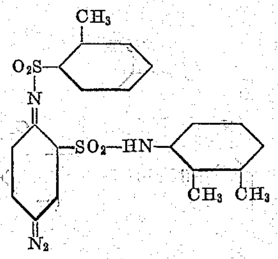
(Formula 55)
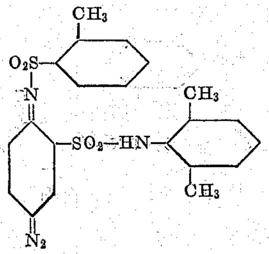
(Formula 56)
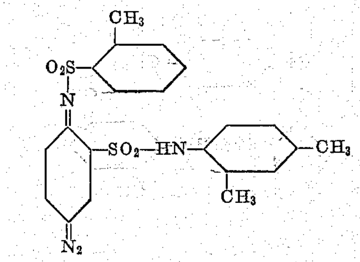

(Formula 57)
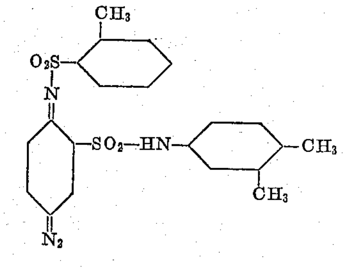
(Formula 58)
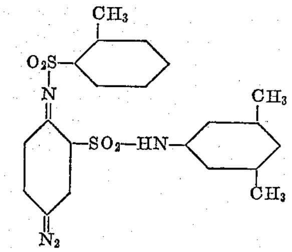
(Formula 59)
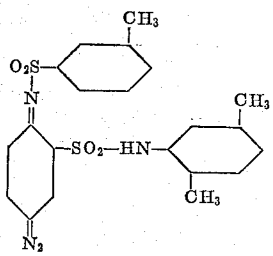
(Formula 60)
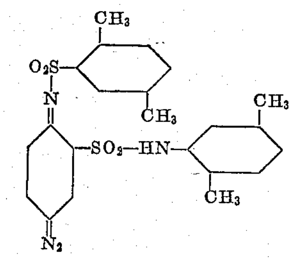
(Formula 61)
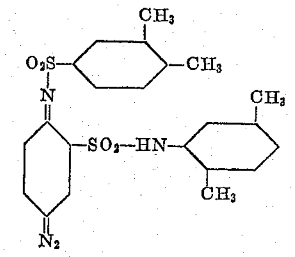
(Formula 62)
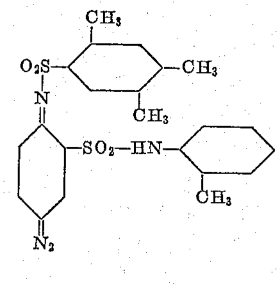
(Formula 63)
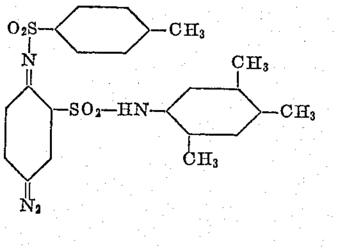
(Formula 64)
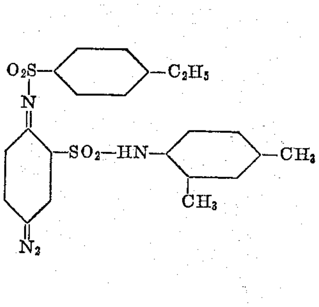
(Formula 65)
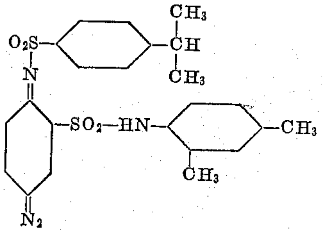
(Formula 66)
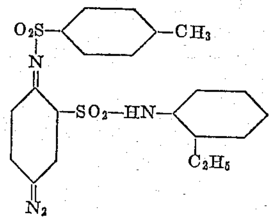

(Formula 67)

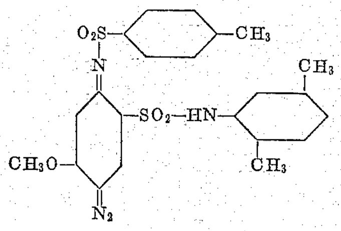

(Formula 68)

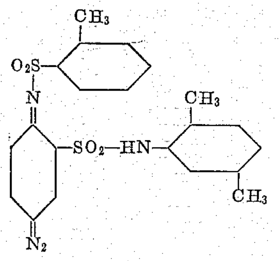

(Formula 69)

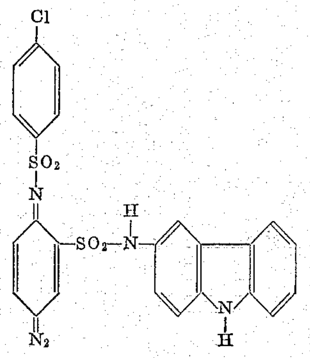

The iminoquinone diazides of the invention are, for practical purposes, insoluble in water but are soluble in organic solvents. They are applied in known manner, in solution in organic solvents, to suitable supports, e.g., metal plates or metal foils, preferably aluminum or zinc, or paper. It can be advantageous if resins, preferably alkali-soluble resins, are applied in association with the light-sensitive compounds to the surface of the supports. They favor film-formation and increase the adherence of the image, i.e., the printing image remaining on the support after the development of the exposed reproduction coating, because the light reaction products of the iminoquinone diazides react with the resins which are capable of being anchored to the supports. For example, the phenolformaldehyde resin novolaks commercially available under the registered trademark "Alnovol" and the conversion products obtained therefrom by etherification with chloroacetic acid have proved to be very suitable resins for this purpose. Processes of preparation for these etherification products are described in detail in German patent spec. No. 1,053,930, in Example 5.

For special effects, e.g., to prevent crystallization in the reproduction coating and/or to increase resistance to the developer, it may be advantageous for mixtures of the iminoquinone diazide compounds of the invention to be used in the light-sensitive coating.

For the preparation of a printing plate from the presensitized material of the invention, the reproduction material is exposed to light under a master. The image formed is at first barely visible; it becomes clearer only after development, when it becomes a pale yellow color. If dyestuffs are added to the coatings, the images have the color of the dyestuff; this has the advantage that the development process can be better followed. Dyestuff additions do not interfere in any way with the process, because it is only with the light-decomposition products that the dyestuffs form precipitation products during development which are insoluble and not with the light-sensitive substance. Here, too, dilute alkalis are suitable as developers, e.g., solutions of alkali metal salts of phosphoric acid and the alkali metal salts of the various forms of silicic acid. Organic bases, e.g., the ethanolamines, in the form of aqueous solutions thereof may also be used as developers. In the case of development with solutions containing alkali silicate, water-conduction in the image-free parts of the surface of the support is adequate after the alkaline treatment, so that further treatment with dilute acids, such as is usually performed in the printing trade is not necessary.

The light-decomposition products of the iminoquinone diazides of the invention are characterized by excellent oleophilic properties and they accept greasy ink with great facility. This is of great technical importance because the printing plates once ready for printing will give full-value copies after only a few turns of the roller of the rotary printing machine.

Not only is the reproduction material of the invention of exceptional suitability for the preparation of planographic printing plates but, also, because of the greater resistance of the light-decomposition products to acids, the surface of the support can be etched, e.g., with nitric acid, after development, and stencils suitable for relief printing thereby prepared.

The iminoquinone diazides corresponding to the formula given above are obtained by the following processes:

(1) 1-chloro-4-nitro-benzene-2-sulfochloride is reacted with an aromatic base, as a result of which the 1-chloro-4-nitro-benzene-2-sulfarylamides are formed. These intermediate products are condensed in solvents with aryl sulfonamides, in the presence of copper powder and alkali carbonate. The chlorine in the one position is thus replaced by the aryl sulfonamide residue. The nitro compounds obtained can be reduced by known processes, e.g., by means of sodium dithionite, and the amines thus obtained are diazotized in water-miscible solvents, e.g., in a mixture of dimethyl formamide and glacial acetic acid. The iminoquinone diazides, for the most part, precipitate out in the form of sparingly soluble compounds, or they can be precipitated by the addition of water.

(2) 4-nitro-1-amino-benzene-2-sulfonic acid is reacted with aromatic sulfochlorides and the 1-aryl-sulfamino-4-nitro-2-benzene-sulfonic acids thus obtained are converted into sulfochlorides which are then reacted with aromatic bases. The nitro compounds thus obtained are further processed as described above under (1).

The list below gives

In Column 1—the number of the compound in the formula list above,

In Column 2—the R constituent,

In Column 3—the

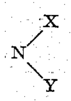

constituent,

In Column 4—the R′ constituent,

In Column 5—the decomposition point of the iminoquinone diazide, and

In Column 6—the most advantageous developer for a reproduction coating containing the iminoquinone diazide in question as the light-sensitive substance. Column 6 gives the percentage content of active substance in the aqueous developer, the letter A standing for sodium metasilicate and B for trisodium phosphate.

| 1 | 2 | 3 | 4 | 5 | 6 |
|---|---|---|---|---|---|
| 1 | 4-methyl-phenyl | 2,5-dimethyl-phenyl-amino | | 175° C | 1% A. |
| 2 | 2,4,6-trimethyl-phenyl | 4-methoxy-phenyl-amino | | 154–156° C | 1% B and 0.3% A. |
| 3 | 2,4-dichloro-phenyl | do | | 150–152° C | 1% B. |
| 4 | 4-methyl-phenyl | 4-isopropyl-phenyl-amino | | 163–165° C | 1.5% B and 0.3% A. |
| 5 | 2,4,5-trimethyl-phenyl | 4-chloro-phenyl-amino | | 130–140° C | 1% B. |
| 6 | 4-chloro-phenyl | 4-methoxy-phenyl-amino | | | 1.5% B. |
| 7 | Phenyl | Phenyl-ethyl-amino | | 176° C | 1% B. |
| 8 | 4-methyl-phenyl | Phenyl-amino | | 170° C | 0.25% B. |
| 9 | Phenyl | do | | 180–184° C | 0.5% B. |
| 10 | 4-chloro-phenyl | do | | 163° C | 0.5% B. |
| 11 | Phenyl | 2-chloro-phenyl-amino | | 174° C | 0.25% B. |
| 12 | do | 2-chloro-4-methoxy-phenyl-amino | | 170–173° C | 0.5% B. |
| 13 | do | 3-chloro-phenyl-amino | | 145° C | 0.5% B. |
| 14 | do | do | | 182° C | 0.5% B. |
| 15 | 4-methyl-phenyl | Diethyl-amino | | | 1% B. |
| 16 | 4-methoxy-phenyl | Phenyl-amino | | | 1% B. |
| 17 | do | 3,5-dimethyl-phenyl-amino | | | 0.5% B. |
| 18 | Phenyl | 2,4-dichloro-phenyl-amino | | 168° C | 0.5% B. |
| 19 | do | β-napthyl-amino | | ~160–190° C | 1% B. |
| 20 | do | 4-methoxy-phenyl-amino | | 155–156° C | 0.5% B. |
| 21 | 4-methyl-phenyl | Propyl-amino | | 156–158° C | 0.5% B. |
| 22 | do | n-Butyl-amino | | 151–152° C | 0.5% B. |
| 23 | 4-chloro-phenyl | 4-chloro-phenyl-amino | | 178–180° C | 1% B. |
| 24 | 4-methyl-phenyl | do | | 170° C | 1% B. |
| 25 | Phenyl | Isobutyl-amino | | ~140° C | 1% B. |
| 26 | 2-methyl-phenyl | Phenyl amino | | 180° C | 1% B. |
| 27 | 2,4-dichloro-phenyl | Diphenyl-(4)-amino | | 180–190° C | 1% A. |
| 28 | do | 2-diphenyl-ether-(1)-amino | | 170° C | 2% A. |
| 29 | 4-chloro-phenyl | 2,4-dichloro-phenyl-amino | | ~190° C | 1% B. |
| 30 | do | 2,5-dimethyl-phenyl-amino | | 169° C | 1% B. |
| 31 | 2,4,5- trimethyl-phenyl | Phenyl-amino | | 177° C | 1% B. |
| 32 | 4-methyl-phenyl | 2-methyl-phenyl-amino | | 166° C | 1% B. |
| 33 | do | 2-methoxy-phenyl-amino | | 145° C | 1% A. |
| 34 | do | 4-methoxy-phenyl-amino | | 150–151° C | 0.5% B. |
| 35 | 4-chloro-phenyl | 2-chloro-4-methoxy-phenyl-amino | | 179° C | 1% A. |
| 36 | 4-methyl-phenyl | 2,5-dimethoxy-phenyl-amino | | 178° C | 1% B. |
| 37 | 4-chloro-phenyl | 4,5-dimethyl-phenyl-amino | | | 3% B. |
| 38 | do | 2,5-dichloro-phenyl-amino | | 173° C | 0.5% B. |
| 39 | do | 2,6-dimethyl-phenyl-amino | | 160–170° C | 1% A. |
| 40 | 2,4,5-trimethyl-phenyl | 4-isopropyl-phenyl-amino | | | 1% A. |
| 41 | do | 4-methoxy-phenyl-amino | | ~170–176° C | 5% B. |
| 42 | 4-chloro-phenyl | 4-isopropyl-phenyl-amino | | | 3% B. |
| 43 | 4-methoxy-phenyl | 2,5-dimethyl-phenyl-amino | | 125–130° C | 1% A. |
| 44 | 4-isopropyl-phenyl | 4-methoxy-phenyl-amino | | 154–155° C | 1% A. |
| 45 | do | 4-isopropyl-phenyl-amino | | | 1% A. |
| 46 | 4-methyl-phenyl | 2,5-dimethyl-phenyl-amino-chlorine | | 157–158° C | 1.3% A. |
| 47 | do | 2.5-dimethyl-phenyl-amino-methyl | | 169–162° C | 1.3% A. |
| 48 | do | do | | | |
| 49 | do | 2,3-dimethyl-phenyl-amino | | 172° C | 3% B. |
| 50 | do | 2,6-dimethyl-phenyl-amino | | 181° C | 1.5% A. |
| 51 | do | 2,4-dimethyl-phenyl-amino | | 171° C | 1.5% A. |
| 52 | do | 3,4-dimethyl-phenyl-amino | | 158° C | 1.5% A. |
| 53 | do | 3,5-dimethyl-phenyl-amino | | 180° C | 1.5% A. |
| 54 | 2-methyl-phenyl | 2,3-dimethyl-phenyl-amino | | 136° C | 4.5% B. |
| 55 | do | 2,6-dimethyl-phenyl-amino | | 159° C | 1.5% A. |
| 56 | do | 2,4-dimethyl-phenyl-amino | | 185° C | 5% B. |
| 57 | do | 3,4-dimethyl-phenyl-amino | | 144° C | 1.5% A. |
| 58 | do | 3,5-dimethyl-phenyl-amino | | 134° C | 1.5% A. |
| 59 | 3-methyl-phenyl | 2,5-dimethyl-phenyl-amino | | 181° C | 1.5% A. |
| 60 | 2,5-dimethyl-phenyl | do | | 162° C | 4% B. |
| 61 | 3,4-dimethyl-phenyl | do | | 167° C | 1.5% A. |
| 62 | 2,4,5-trimethyl-phenyl | 2-methyl-phenyl-amino | | 170° C | 3% B. |
| 63 | 4-methyl-phenyl | 2,4,5-trimethyl-phenyl-amino | | 188° C | 4% B. |
| 64 | 4-ethyl-phenyl | 2,4-dimethyl-phenyl-amino | | 182° C | 2% A. |
| 65 | 4-isopropyl-phenyl | do | | 182–5° C | 3% A. |
| 66 | 4-methyl-phenyl | 2-ethyl-phenyl-amino | | 178° C | 1.5% A. |
| 67 | do | 2,5-dimethyl-phenyl-amino | 2-methoxy | 166–7° C | 4% B. |
| 68 | 2-methyl-phenyl | do | | 151° C | 1.5% A. |
| 69 | 4-chloro-phenyl | Carbazolyl-(3)-amino | | 170° C | 3.0% B+1.8% A. |

The invention will be further illustrated by reference to the following specific examples:

*Example 1*

1.3 parts by weight of the diazo compound 1-((4'-methyl-benzene-1'-sulfonyl) - imino)-2(2",5"-dimethyl-phenylamino - sulfonyl) - benzoquinone-(1,4)-diazide(4), corresponding to Formula 1, are dissolved in a mixture of 80 parts by weight of glycol monomethylether and 20 parts by weight of butyl acetate. For the preparation of a light-sensitive paper printing foil, this solution is coated by means of a whirler upon a commercially available paper which has been covered on one side with a coating consisting of casein and clay hardened with formaldehyde. After the light-sensitive coating has been thoroughly dried by hot air, the sensitized foil is exposed under a transparent negative master, by the contact process, to an 18-amp arc lamp at a distance of about 70 cm. for two minutes. For development of the image formed, the exposed coating is rubbed down with a 2% trisoduim phosphate solution, whereupon the image which previously was barely visible becomes clear. The developed foil is wiped over with a 1% phosphoric acid solution and a yellowish-green positive image is thus obtained from the negative master. The paper foil, which is water-conductive in the parts not covered by the image, is inked up with greasy ink and used as a printing plate. It gives long runs.

The diazo compound mentioned above (Formula 1) is prepared as follows:

3.6 parts by weight of p-xylidine and 9 parts by weight of 1-chloro-4-nitrobenzene-2-sulfochloride are added to 30 parts by weight of water at 90–95° C. A solution of 2.3 parts by weight of sodium carbonate in 18 parts by weight of water is then slowly added with vigorous stirring. After condensation is completed, the reaction mixture is acidified and the precipitated reaction product is separated by suction filtration while still hot and then washed with water. For purification, the crude reaction product is dissolved in hot, dilute sodium hydroxide solution. The solution is filtered over animal charcoal and the reaction product is reprecipitated by acidification of the filtrate. The melting point is 143–144° C.; yield is 70–80% of theoretical.

A mixture of 3.4 parts by weight of 1-chloro-4-nitro-benzene-2-sulfonic acid-(2',5'-dimethylanilide), 3.4 parts by weight of p-toluene-sulfonamide, 2.2 parts by weight of potassium carbonate, 0.1 part by weight of copper powder and 0.1 part by weight of cuprous chloride is heated for 3 hours with stirring in 9.8 parts by weight of nitrobenzene at 160–170° C. The water formed during the reaction is removed as it is formed by a current of inert gas which is passed through the reaction mixture, and then the nitrobenzene is driven off with steam. The alkaline solution which remains is treated with decolorizing carbon and the condensation product is precipitated therefrom with acid at 90–100° C. The compound 1-((4'-methyl-benzene-1'-sulfonyl)-amino)-2-(2'',5''-dimethylphenylamino-sulfonyl)-4-nitrobenzene is purified by recrystallization from dilute acetone or by way of its disodium salt, which is sparingly soluble in 2 N-sodium hydroxide solution. After being recrystallized from alcohol, it has a melting point of 178–179° C.; yield is 80–90% of theoretical.

12.2 parts by weight of the disodium salt of the nitro compound described above are dissolved in 230 parts by weight of 2.5% sodium hydroxide solution and reduced with about 14 parts by weight of sodium dithionite, i.e., a slight excess, at 90–95° C. The reaction mixture is boiled briefly and then separated by suction filtration over charcoal. The amine is precipitated in solid form from the boiling solution by acidification (pH 5–6). For purification, the reaction product is dissolved in boiling methanol, the solution is suction-filtered over charcoal and the filtrate is concentrated until crystallization occurs. After recrystallization from methanol, the melting point is 164° C.; yield is 70–80% of theoretical.

1 part by weight of the amine is dissolved in a mixture of 2 parts by weight of dimethyl formamide and 4 parts by weight of glacial acetic acid, and is diazotized with a slight excess of 40% sodium nitrite solution at 5° C. The diazotization mixture is stirred and the diazo compound separates out in the form of the iminoquinone diazide. Precipitation is completed by the dropwise introduction of 14 parts by volume of water. The diazo compound decomposes at 170–175° C.; yield is 90–95% of theoretical.

*Example 2*

1.3 parts by weight of the diazo compound 1-((2',4',6'-trimethyl-benzene-1'-sulfonyl)-imino)-2-(4''-methoxyphenylamino-sulfonyl)-benzoquinone-(1,4)-diazide-(4), corresponding to Formula 2, are dissolved in a mixture of 80 parts by volume of glycol monomethylether and 20 parts by volume of butyl acetate, with slight heating. This solution is coated by means of a whirler upon an aluminum foil the surface of which has been mechanically roughened. The coating is dried in hot air and the foil then heated for two minutes to 100° C. to remove residual solvent. The light-sensitive material is exposed under a transparent negative master to an arc lamp and the exposed coating is rubbed down with an aqueous solution containing 10 g. of trisodium phosphate and 3 g. of sodium metasilicate per liter and the image thereby developed. The foil can now be inked up with greasy ink without further treatment. The developed foil may, for example, be set up in a printing apparatus and the greasy ink applied by means of the inking rollers. Positive prints of the negative master used are obtained.

For the preparation of the diazo compound corresponding to Formula 2, 15 parts by weight of 1-chloro-4-nitrobenzene-3-sulfonic acid-(4'-methoxy-anilide) are condensed with 17.5 parts by weight of 2,3,5-trimethylbenzene sulfonic acid amide in the presence of 9.7 parts by weight of potassium carbonate, 0.9 part by weight of copper powder and 0.9 part by weight of cuprous chloride in 150 parts by volume of nitrobenzene at 160–165° C., in a manner analogous to that described in Example 1. Further processing and purification of the reaction product via the disodium salt of the nitro compound are exactly analogous to the process described in Example 1. After being recrystallized from acetone/methanol the compound melts at 198–199° C., yield is 70–80% of theoretical.

10.8 parts by weight of the disodium salt of the nitro compound described above are dissolved in 250 parts by weight of 2.5% sodium hydroxide solution and reduced with about 12 parts by weight of sodium dithionite, i.e., a slight excess at 90–95° C. Animal charcoal is added to the reaction solution, which is then boiled and filtered. When the filtrate is acidified with 10% hydrochloric acid, the amine precipitates out in the the form of a grey amorphous solid substance; yield is 80–85% of theoretical.

The amine obtained is sufficiently pure for subsequent processing and is dissolved in five times its weight of a mixture of two parts by weight of dimethyl formamide and 4 parts by weight of glacial acetic acid, and is then diazotized with 40% sodium nitrite solution at +5° C. The iminoquinone diazide precipitates out in the form of yellow crystals and precipitation is completed by the gradual introduction of 20 parts by volume of water. The melting point is 154–156° C.

All the other compounds listed in the table are suitable for the preparation of printing plates by the process described in this example.

*Example 3*

1.5 parts by weight of the diazo compound 1-((2',4'-dichloro-benzene-1'-sulfonyl)-imino)-2-(4''-methoxyphenylamino-sulfonyl)-benzoquinone-(1,4)-diazide-(4), corresponding to Formula 3, are dissolved together with 1 part by weight of an alkali-soluble novolak, e.g., the phenol-formaldehyde resin commercially available under the trade name Alnovol, in 100 parts by volume of glycol monomethylether. This solution is coated by means of a whirler upon a mechanically roughened aluminum foil and the coating is dried and exposed to light as desribed in Example 2. The developer used is a 1% trisodium phosphate solution and the developed foil is then wiped over with 1% phosphoric acid; a pale yellow positive image of the negative master is obtained which is then linked up with greasy ink. The printing plate thus produced can be used for the preparation of copies in the apparatus commonly used for offset printing.

The diazo compound corresponding to Formula 3 is obtained by a process analogous to that described in Example 1.

15 parts by weight of 1-chloro-4-nitrobenzene-2-sulfonic acid-(4'-methoxy-anilide) are condensed with 19.80 parts by weight of 2,4-dichloro-benzene-sulfonamide in the presence of 9.7 parts by weight of potassium carbonate, 1.5 parts by weight of copper powder and 1.5 parts by weight of cuprous chloride in 100 parts by volume of nitrobenzene at 160° C.

The reaction is conducted in a current of nitrogen and vigorous stirring is maintained. The reaction product is further processed as described in Example 1. The 1-((2',4'-dichloro-benzene-1'-sulfonyl)-amino)-2-(4''-methoxy-phenylamino-sulfonyl)-4-nitrobenzene, after being recrystallized from glacial acetic acid, is in the form of a colorless substance with a melting point of 182–183° C.; yield is 70–75% of theoretical.

The corresponding amine is prepared therefrom by reduction with sodium dithionite in alkaline solution. After recrystallization from an acetone/methanol mixture, it is obtained in the form of colorless crystals with a melting point of 172–173.5° C.; it is diazotized as described in Example 1. A suitable solution for use in the diazotization process is a mixture of 70 parts by volume of dimethyl formamide and 100 parts by volume of glacial acetic acid. The diazo compound precipitates out in the form of yellow crystals which melt, with decomposition, at 150–155° C.

*Example 4*

1.3 parts by weight of the diazo compound 1-((4'-methyl-benzene-1'-sulfonyl)-imino)-2-(4'-isopropylphenylamino-sulfonyl)-benzoquinone-(1,4)-diazide- (4), corresponding to Formula 4, are dissolved in a mixture of 80 parts by volume of glycol monomethylether and 20 parts by volume of butyl acetate. 0.3 part by weight of a resin-like product obtained by condensation of a phenol-formaldehyde novolak with chloroacetic acid, e.g., a condensation product obtained from the phenol-formaldehyde resin Alnovol and chloroacetic acid by the process described in Example 5 of German Patent No. 1,053,930, is added to this solution. This solution is coated upon a roughened aluminum foil, and the coated side is dried and exposed under a transparent negative master for two minutes to an arc lamp. The image formed is developed with a 1.5% aqueous trisodium phosphate solution and the foil bearing the positive image is immediately linked up with greasy ink and used as a printing plate.

The preparation of the compound corresponding to Formula 4 is analogous to the method described in Example 1. 15 parts by weight of 1-chloro-4-nitrobenzene-2-sulfonic acid-(4'-isopropyl-anilide) are condensed with 13.7 parts by weight of 4-methyl-benzosulfonamide in 100 parts by volume of nitrobenzene, 5.5 parts by weight of potassium carbonate, 0.82 part by weight of copper powder with 0.82 part by weight of cuprous chloride being added. After the processing of the reaction mixture and the purification of the reaction product, the 1-((4'-methylbenzene - 1' - sulfonyl)-amino)-2-(4''-isopropyl-phenylamino-sulfonyl)-4-nitrobenzene, which melts at 162–163° C., is obtained. It is dissolved in 200 parts by volume of 2.5% aqueous sodium hydroxide solution and reduced with sodium dithionite. The free amino compound is obtained from the sodium salt in the form of a colorless amorphous substance by acidification with hydrochloric acid; yield is 80–85%.

20 parts by weight of the amino compound thus obtained are dissolved in a mixture of 50 parts by volume of dioxane and 100 parts by volume of glacial acetic acid and are diazotized with 1.6 parts by weight of sodium nitrite in 10 parts by volume of water. The diazo compound crystallizes out in the form of yellow crystals which melt at 163–165° C. Precipitation is effected by the slow introduction of 300 ml. of water.

*Example 5*

1 part by weight of the diazo compound 1-((2',4',5'-trimethylbenzene - 1' - sulfonyl)-imino) - 2 - (4''-chlorophenylaminosulfonyl) - benzoquinone - (1,4) - diazide-(4), corresponding to Formula 31, and 0.3 part by weight of a condensation product of Alnovol and chloroacetic acid, described in Example 4, are dissolved in 100 parts by volume of glycol monomethylether. This solution is coated by means of a whirler upon an anodically oxidized aluminum foil. Having been well dried, the now light-sensitive foil is exposed to light under a negative transparent master and developed by rubbing down with a 3% trisodium phosphate solution. Then, the side of the foil bearing the image is wiped over with 1% phosphoric acid and inked up with greasy ink. A positive printing plate which produces long runs on the printing machine is obtained.

Instead of the compound corresponding to Formula 31, any of the other compounds corresponding to the general formula above can be used with equal success. Particularly good results are obtained with the compounds corresponding to Formulae 1, 3, 6, 18, 20, 24, 29, 33, 39, and 43.

For the preparation of the diazo compound corresponding to Formula 31, the procedure is analogous to that described in Example 1. 2,4,5-trimethyl-benzosulfamide is condensed with 1-chloro-4-nitrobenzene-2-sulfonic acid-4'-chloro-anilide. A pale yellow nitro compound is obtained which melts at 192–193° C. It is reduced in aqueous alkaline solution with sodium dithionite to the corresponding amine and the amino compound thus obtained consists of colorless crystals which melt at 196–197° C. When this amino compound is diazotized, the diazo compound corresponding to Formula 31 is obtained in the form of yellow crystals which melt with decomposition at 177° C.

*Example 6*

An aluminum foil which has been roughened on both sides is coated with a 1% solution of the diazo compound 1-((4'-chlorobenzene - 1' - sulfonyl)-imino)-2-(4''-methoxyphenylaminosulfonyl)-benzoquinone - (1,4) - diazide-(4), corresponding to Formula 6, in glycol monomethylether. The coating is thoroughly dried and for the production of an image the light-sensitive foil is exposed for 6 minutes under a transparent negative master in a copying apparatus commercially available under the trade name Drulyphot which contains, as a light source, a number of fluorescent tubes. For the development of the image, the exposed foil is treated with a 1.5% aqueous trisodium phosphate solution; it is then wiped over with 1% phosphoric acid and inked up with greasy ink so that it may be used as a printing plate.

The preparation of the diazo compound above is by a process analogous to that described in Example 1. 30.9 parts by weight of 4-chloro-benzosulfamide are condensed with 30 parts by weight of 1-chloro-4-nitrobenzene-2-sulfonic acid (4'-methoxy-anilide) in 200 parts by volume of nitrobenzene at 160–165° C., in the presence of 19.4 parts by weight of potassium carbonate, 2.3 parts by weight of copper powder and 2.3 parts by weight of cuprous chloride. The condensation product obtained is purified by way of the disodium salt, from which the free compound is obtained in an 85% yield, in the form of yellow crystals which melt at 183–184° C. Reduction and diazotization are analogous to the method given in Example 1. A yellow-colored diazonium compound is obtained which melts at 151–152° C.

*Example 7*

4 parts by weight of the diazo compound corresponding to Formula 1, 3 parts by weight of the phenol-formaldehyde resin novolak, commercially available under the trade name Alnovol, and 0.5 part by weight of Methyl Violet (Schultz' Farbstofftabellen, 7th edition, vol. 1, (1931), p. 327, No. 783) are dissolved in 100 parts by volume of glycol monomethylether and the solution is coated by means of a whirler upon a smoothed and polished zinc plate. After the coating has been dried in hot air, the now light-sensitive zinc plate is exposed under a transparent negative film master for five minutes to a carbon arc lamp at a distance of 70 cm. The exposed zinc plate is then wiped over with a 5% aqueous trisodium phosphate solution containing 15% of glycol monomethylether and rinsed down with water. The zinc plate, upon which the positive image of the negative master is now clearly visible in blue on metal ground, is back-coated with asphalt. It is then immersed for 10 minutes in 7% nitric acid, the side bearing the image being treated with a soft artist's brush. The zinc plate with the positive deep-etched image of the negative master is suitable for use as a printing plate.

*Example 8*

1 part by weight of the diazo compound corresponding to Formula 1, 0.25 part by weight of the diazo compound 1-((4'-methyl-benzene-1-sulfonyl)-imino) - 2 - (phenylaminosulfonyl)-benzoquinone-(1,4) - diazide - (4), corresponding to Formula 8, and 0.25 part by weight of the compound 1-((4'-chlorobenzene - 1' - sulfonyl)-imino)-2-(phenylaminosulfonyl)-benzoquinone - (1,4) - diazide-(4), corresponding to Formula 10, together with 0.3 part by weight of a condensation product prepared from a phenol-formaldehyde novolak and chloroacetic acid as described in Example 5 of German Patent No. 1,053,930, are dissolved in 100 parts by volume of glycol monomethylether. This solution is coated upon a mechanically roughened aluminum foil by means of a whirler. The coating is dried in hot air and then heated to 100° C., for two minutes to drive off the solvent completely. The now light-sensitive foil is exposed under a transparent negative master, for two minutes, to an arc lamp at a distance of 70 cm. and the exposed coating is developed with a 2% aqueous trisodium phosphate solution. The side bearing the image is wiped over with 1% aqueous phosphoric acid and inked up with greasy ink. The foil, with the positive image of the negative master, can be used as a printing plate for the preparation of copies. Very long runs can be achieved.

For the preparation of the diazo compound corresponding to Formula 8, 1-chloro-4-nitrobenzene-2-sulfonic acid anilide is condensed with 4-methyl-benzosulfamide in a manner analogous to that described in Example 1, and a nitro compound, which after recrystallization from methanol melts at 168–169° C., is obtained in 80–90% yield. The reduction of the nitro compound is effected in alkaline solution wth sodium dithionite and the amine is obtained in 70–80% yield. After recrystallization from methanol it melts at 173° C. Diazotization then yields the diazo compound corresponding to Formula 8 in the form of yellow crystals which melt at 168–170° C.

The diazo compound corresponding to Formula 10 is obtained in an analogous manner. The condensation process is performed with 1-quinone-4-nitrobenzene-2-sulfonic acid anilide and 4-chloro-benzosulfamide. A pale yellow nitro compound, which melts at 171–172° C., is obtained in 80–90% yield. From this, the amino compound is produced in 60–70% yield and has the form of colorless crystals which melt at 168–170° C. The diazo compound corresponding to Formula 10 is obtained therefrom in 90–95% yield by diazotization. It melts, with decomposition, at 163° C.

*Example 9*

1.5 parts by weight of the diazo compound corresponding to Formula 58, 1-((2′-methylbenzene-1′-sulfonyl)-imino) - 2 - (3″,5″-dimethyl-phenylamino-sulfonyl)-benzoquinone-(1,4)-diazide-4, and 0.5 part by weight of a copolymer of styrene and maleic anhydride traded by the U.S. company Monsanto Chemical Co. under the trade name of "Lustrex 820," are dissolved in 100 parts by volume of ethyleneglycol monomethylether. An aluminum foil mechanically roughened on both surfaces is coated with this solution and then dried, as described in Example 2. Subsequently, the light sensitive foil is exposed for two minutes under a transparent master to the light of a carbon arc lamp. By wiping over with a cotton pad soaked in a 5% aqueous trisodium phosphate solution, a printing plate is obtained which produces long runs.

The diazo compound corresponding to Formula 58 is prepared as follows:

1 - chloro-4-nitro-benzene-2-sulfonic-acid-(3′,5′-dimethylphenyl)-amide is condensed with 2-methyl-benzosulfamide in accordance with the statements made in Example 1, and an about 70% yield of a nitro compound is obtained, which, after recrystallization from methanol, melts at 183° C. Subsequently, the nitro compound is reduced with sodium dithionite in an alkaline solution. A yield of 60% of the theoretical is obtained of an amine, which is purified by recrystallization from methanol and melts at 220–221° C. By diazotization the diazo compound corresponding to Formula 58 is obtained in the form of yellow crystals which decompose at about 134° C.

This application is a division of copending application, Serial No. 50,317, filed August 18, 1960.

It will be obvious to those skilled in the art that many modifications may be made within the scope of the present invention without departing from the spirit thereof, and the invention includes all such modifications.

What is claimed is:

1. A compound having the formula

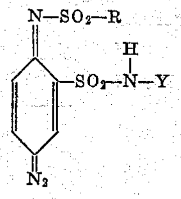

in which R and Y are aryl groups.

2. A compound having the formula

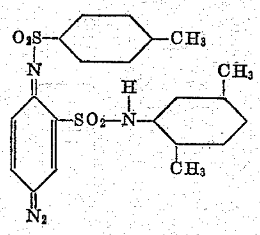

3. A compound having the formula

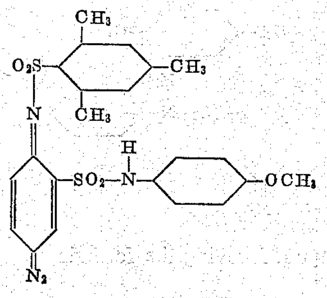

4. A compound having the formula

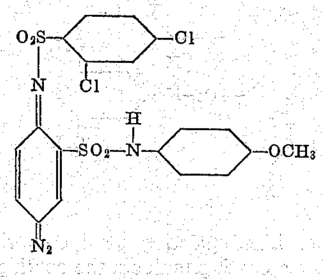

5. A compound having the formula

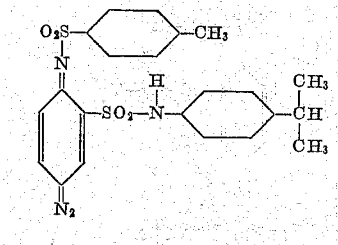

6. A compound having the formula

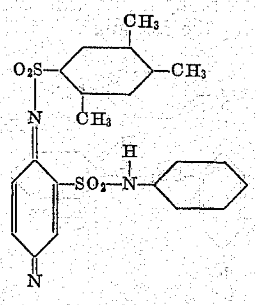

7. A compound having the formula

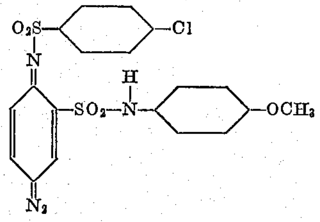

8. A compound having the formula

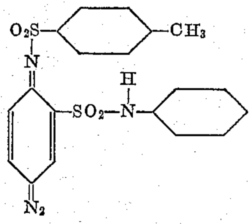

9. A compound having the formula

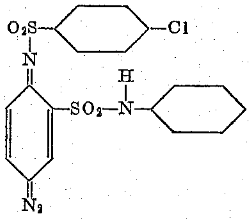

10. A compound having the formula

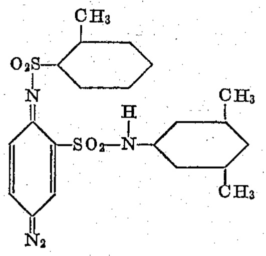

11. A presensitized printing plate comprising a base material having a coating thereon, the coating comprising a compound having the formula

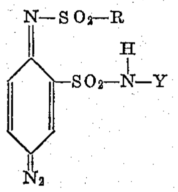

in which R and Y are aryl groups.

12. A presensitized printing plate comprising a base material having a coating thereon, the coating comprising a compound having the formula

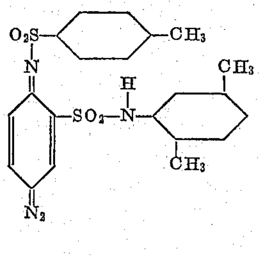

13. A presensitized printing plate comprising a base material having a coating thereon, the coating comprising a compound having the formula

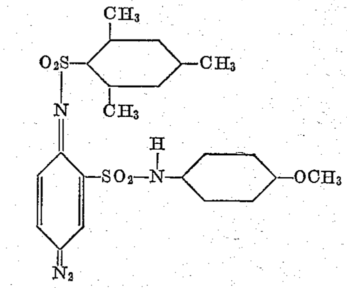

14. A presensitized printing plate comprising a base material having a coating thereon, the coating comprising a compound having the formula

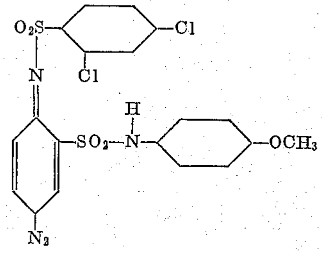

15. A presensitized printing plate comprising a base material having a coating thereon, the coating comprising a compound having the formula

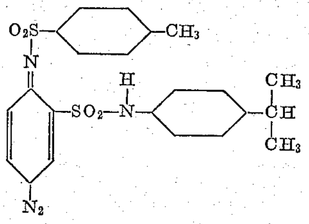

16. A presensitized printing plate comprising a base material having a coating thereon, the coating comprising a compound having the formula

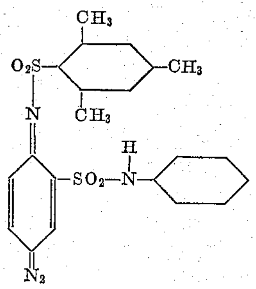

17. A presensitized printing plate comprising a base material having a coating thereon, the coating comprising a compound having the formula

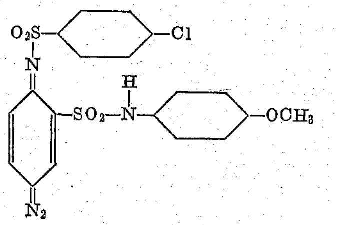

18. A presensitized printing plate comprising a base material having a coating thereon, the coating comprising a compound having the formula

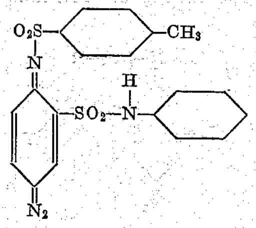

19. A presensitized printing plate comprising a base material having a coating thereon, the coating comprising a compound having the formula

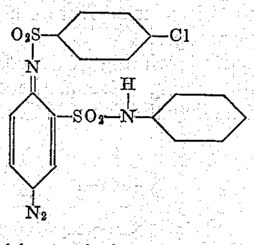

20. A presensitized printing plate according to claim 11 in which the coating contains an alkali-soluble resin.

21. A presensitized printing plate comprising a base material having a coating thereon, the coating comprising a compound having the formula

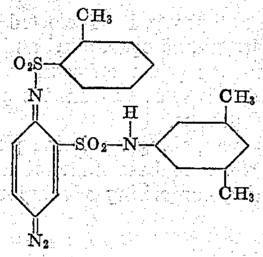

22. A process for making a printing plate which comprises exposing a coated base material to light under a master, the coating comprising a compound having the formula

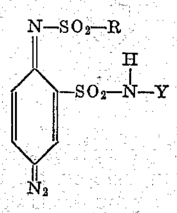

in which R and Y are aryl groups, and treating the exposed coating with dilute alkali developing solution.

23. A process for making a printing plate which comprises exposing a coated base material to light under a master, the coating comprising a compound having the formula

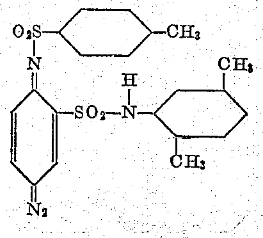

and treating the exposed coating with a dilute alkali developing solution.

24. A process for making a printing plate which comprises exposing a coated base material to light under a master, the coating comprising a compound having the formula

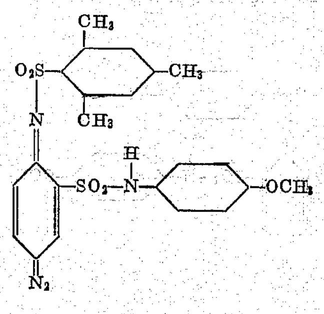

and treating the exposed coating with a dilute alkali developing solution.

25. A process for making a printing plate which comprises exposing a coated base material to light under a master, the coating comprising a compound having the formula

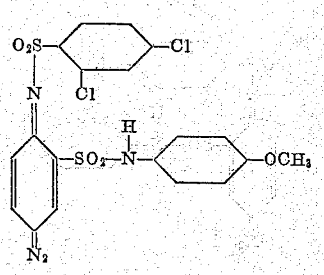

and treating the exposed coating with a dilute alkali developing solution.

26. A process for making a printing plate which comprises exposing a coated base material to light under a master, the coating comprising a compound having the formula

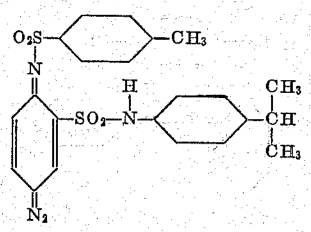

and treating the exposed coating with dilute alkali developing solution.

27. A process for making a printing plate which comprises exposing a coated base material to light under a master, the coating comprising a compound having the formula

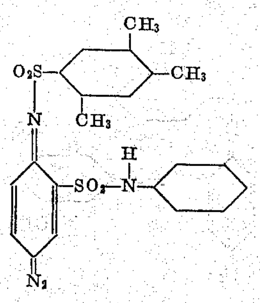

and treating the exposed coating with dilute alkali developing solution.

28. A process for making a printing plate which comprises exposing a coated base material to light under a master, the coating comprising a compound having the formula

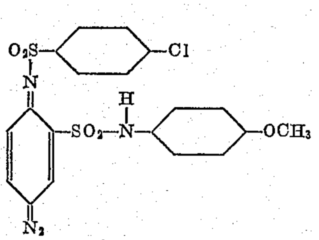

and treating the exposed coating with a dilute alkali developing solution.

29. A process for making a printing plate which comprises exposing a coated base material to light under a master, the coating comprising a compound having the formula

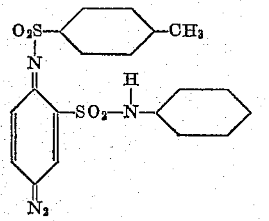

and treating the exposed coating with a dilute alkali developing solution.

30. A process for making a printing plate which comprises exposing a coated base material to light under a master, the coating comprising a compound having the formula

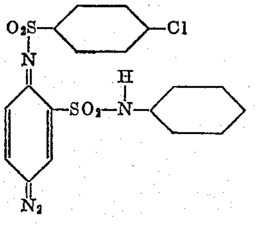

and treating the exposed coating with a dilute alkali developing solution.

31. A process for making a printing plate which comprises exposing a coated base material to light under a master, the coating comprising a compound having the formula

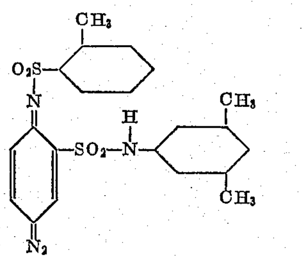

and treating the exposed coating with a dilute alkali developing solution.

32. A process according to claim 22 in which the coating contains an alkali-soluble resin.

33. A compound having the formula

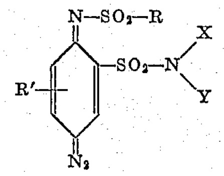

in which R is an aryl group, R′ is selected from the group consisting of hydrogen, halogen, alkyl and alkoxy groups, X is selected from the group consisting of hydrogen and alkyl groups, and Y is selected from the group consisting of alkyl and aryl groups.

34. A presensitized printing plate comprising a base material having a coating thereon, the coating comprising a compound having the formula

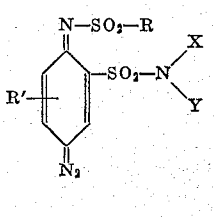

in which R is an aryl group, R′ is selected from the group consisting of hydrogen, halogen, alkyl and alkoxy groups, X is selected from the group consisting of hydrogen and alkyl groups, and Y is selected from the group consisting of alkyl and aryl groups.

35. A process for making a printing plate which comprises exposing a coated base material to light under a master, the coating comprising a compound having the formula

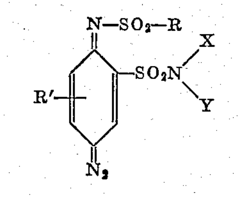

in which R is an aryl group, R′ is selected from the group consisting of hydrogen, halogen, alkyl and alkoxy groups, X is selected from the group consisting of hydrogen and alkyl groups, and Y is selected from the group consisting of alkyl and aryl groups, and treating the exposed coating with a dilute alkali developing solution.

36. A compound having the formula

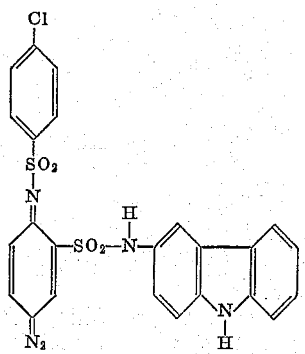

37. A presensitized printing plate comprising a base material having a coating thereon, the coating comprising a compound having the formula

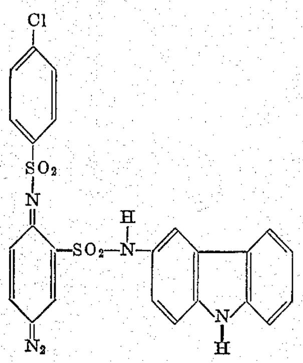

38. A process for making a printing plate which comprises exposing a coated base material to light under a master, the coating comprising a compound having a formula

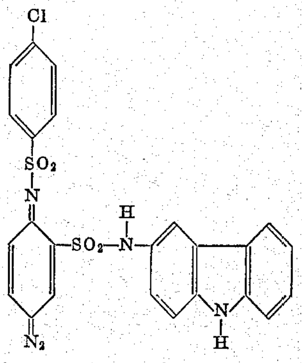

and treating the exposed coating with a developing solution.

No references cited.